Figure 11:
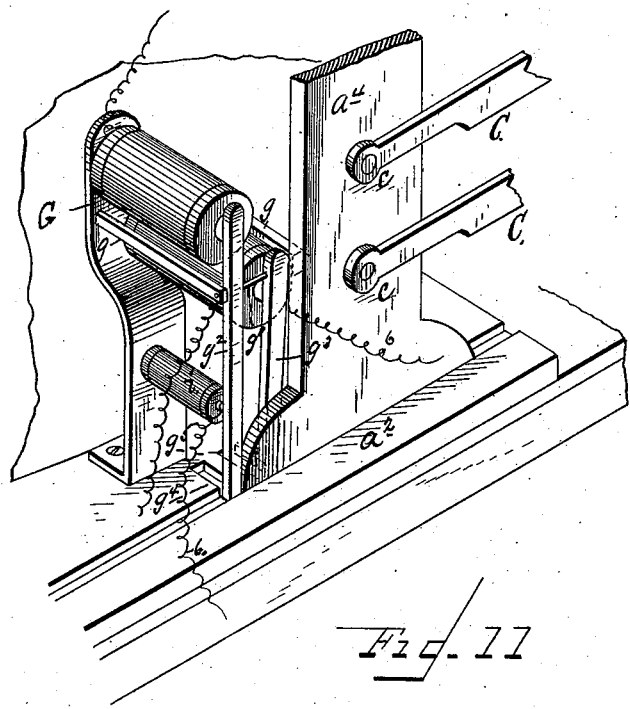

(No Model.) W. W. LE GRANDE. 5 Sheets—Sheet 1.
ELECTRO MECHANICAL SIGNAL APPARATUS.
No. 352,903. Patented Nov. 16, 1886.
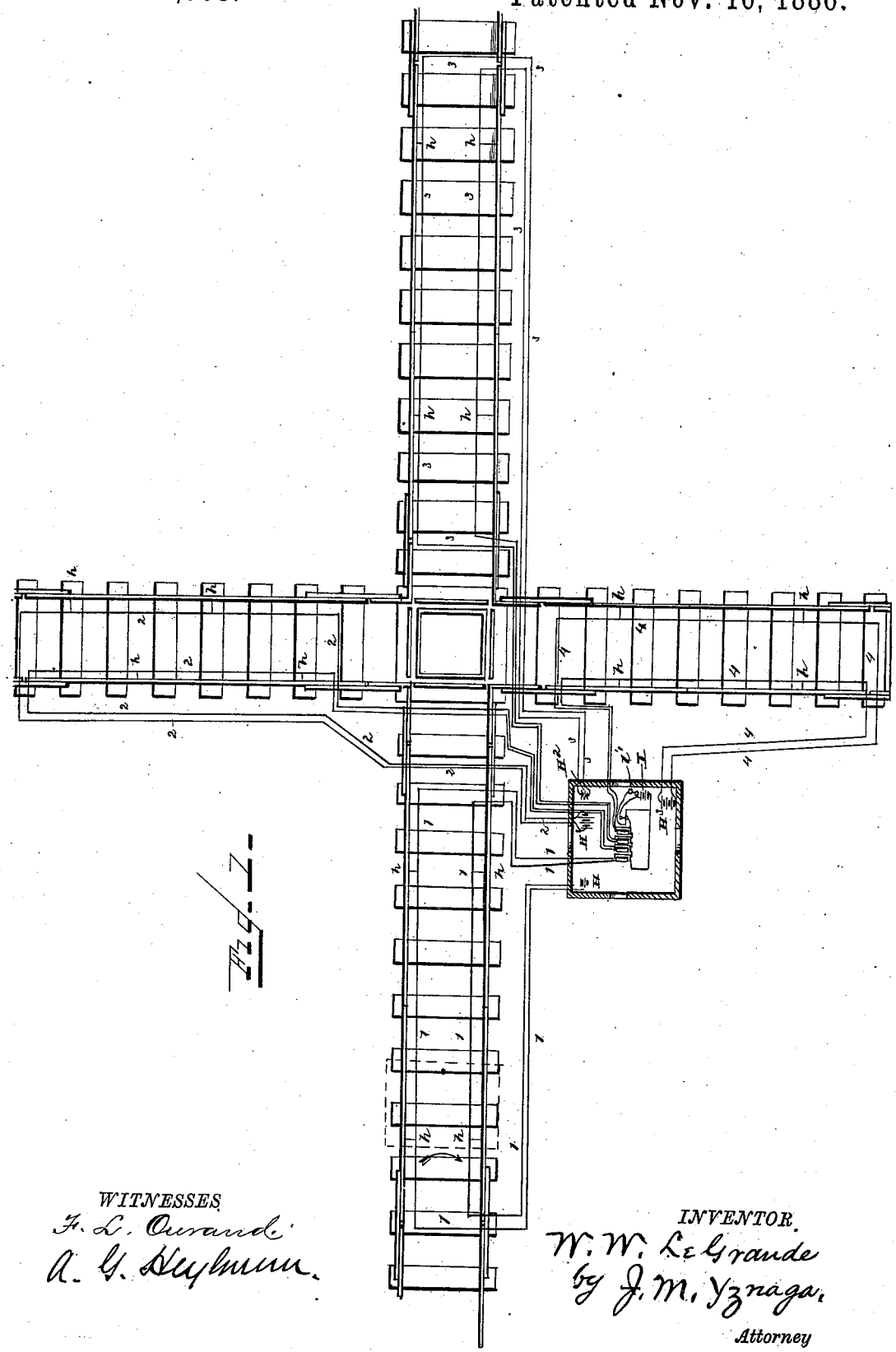
WITNESSES
F. L. Ourand
A. G. Heyman
INVENTOR
W. W. LeGrande
by J. M. Yznaga,
Attorney (No Model.) W. W. LE GRANDE. 5 Sheets—Sheet 2.
ELECTRO MECHANICAL SIGNAL APPARATUS.
No. 352,903. Patented Nov. 16, 1886.
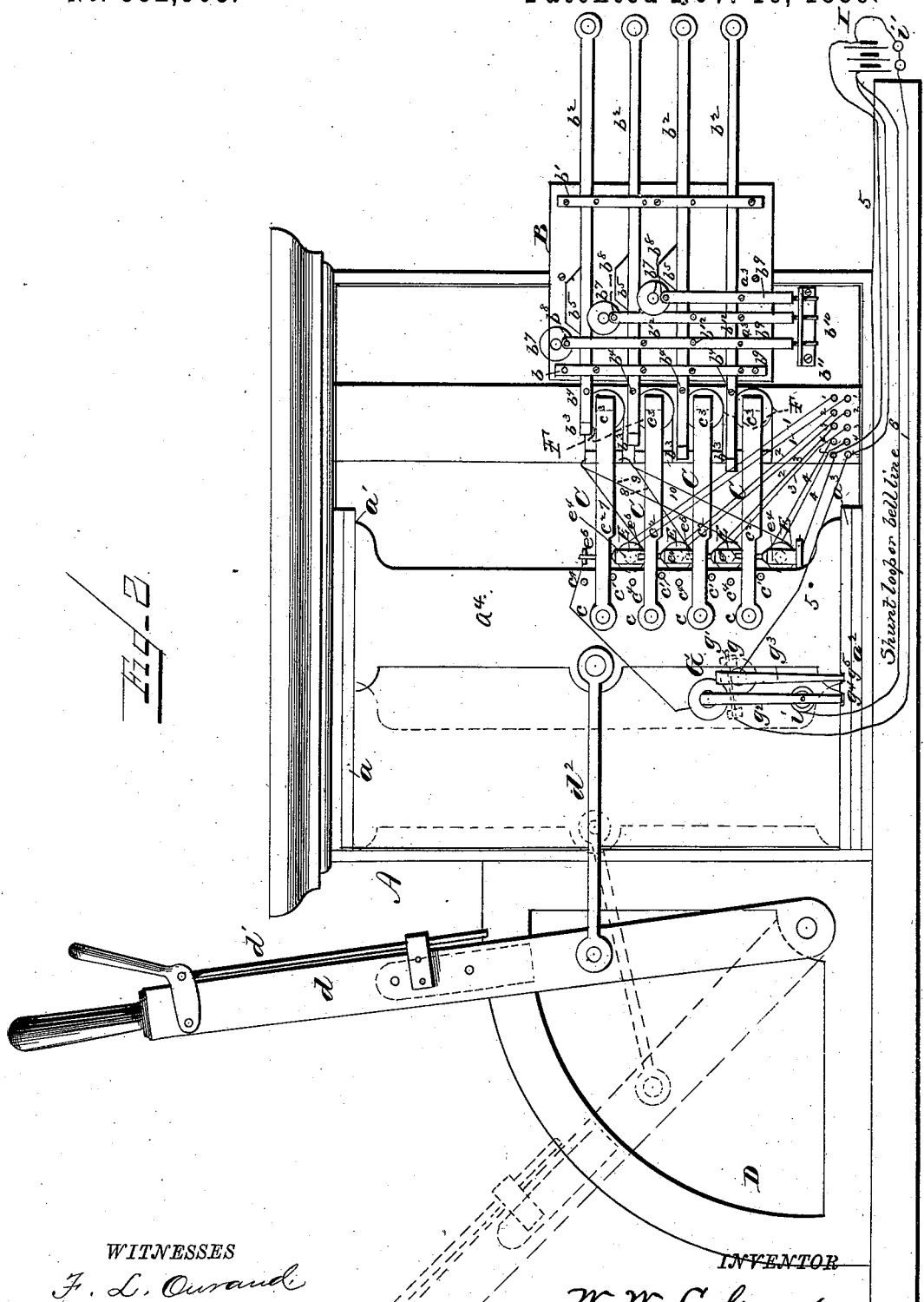
WITNESSES
INVENTOR
W. W. Le Grande
by J. M. Yznaga,
Attorney

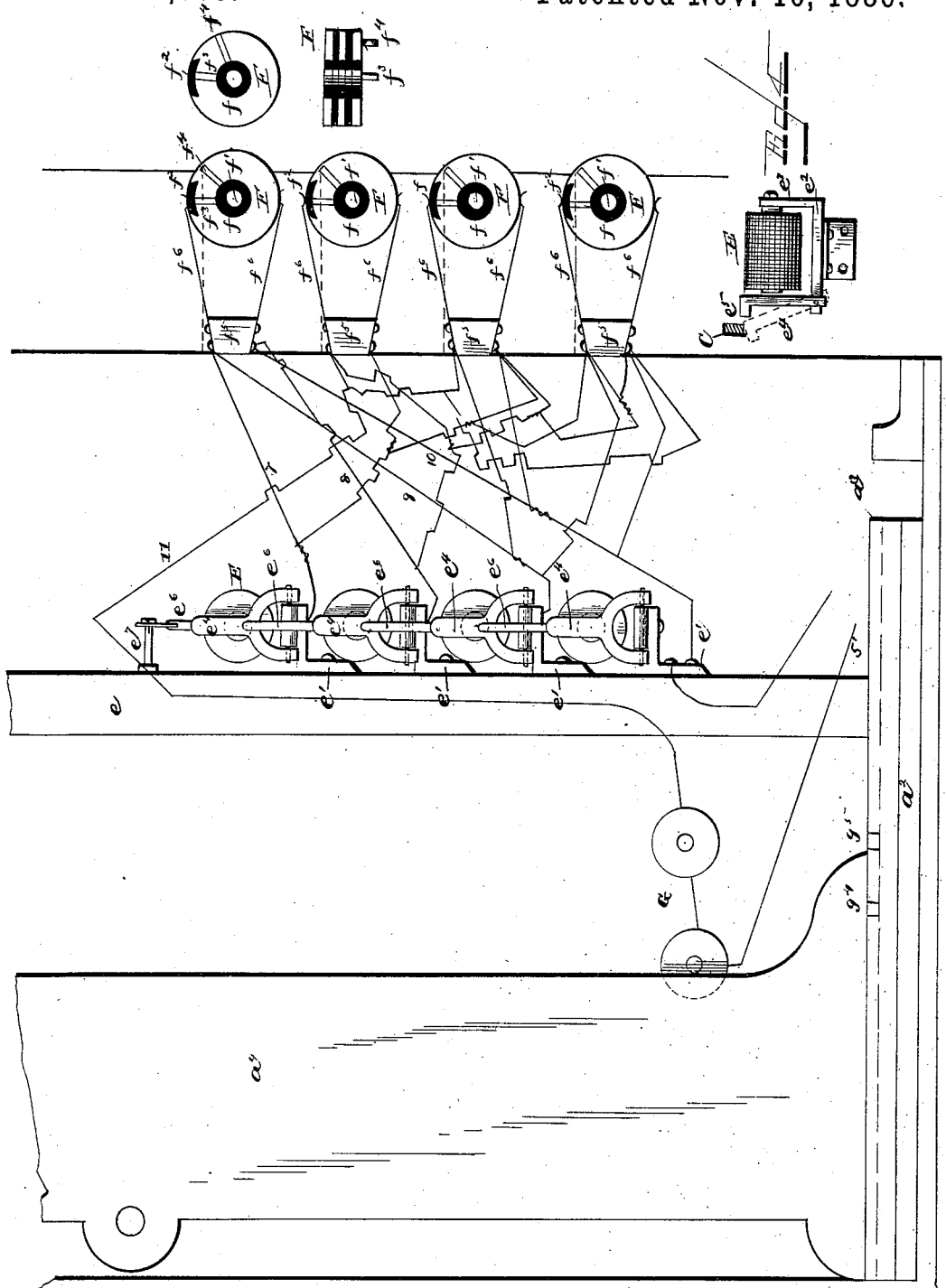

(No Model.) W. W. LE GRANDE. 5 Sheets—Sheet 4.
ELECTRO MECHANICAL SIGNAL APPARATUS.
No. 352,903. Patented Nov. 16, 1886.
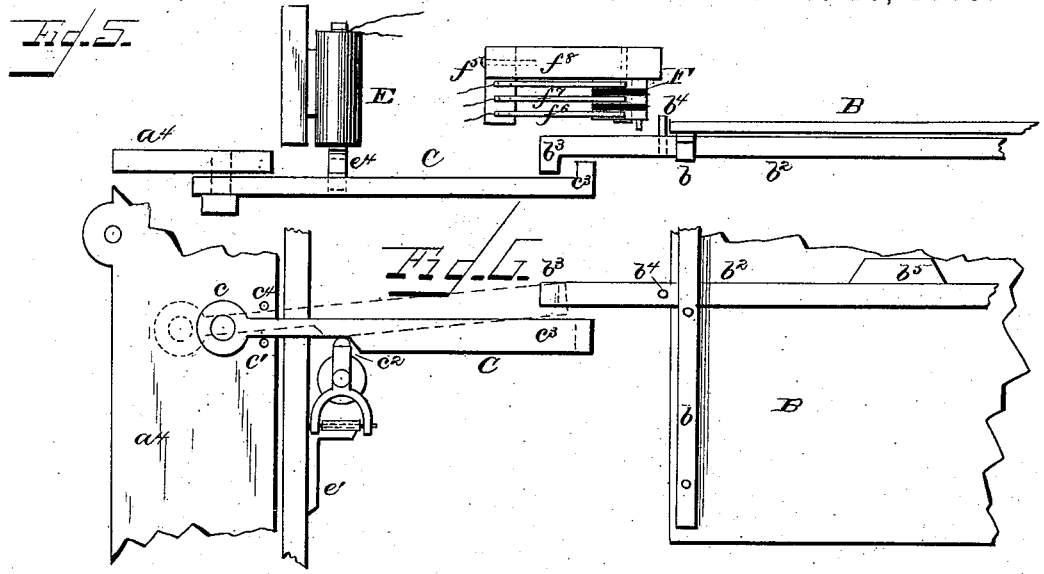
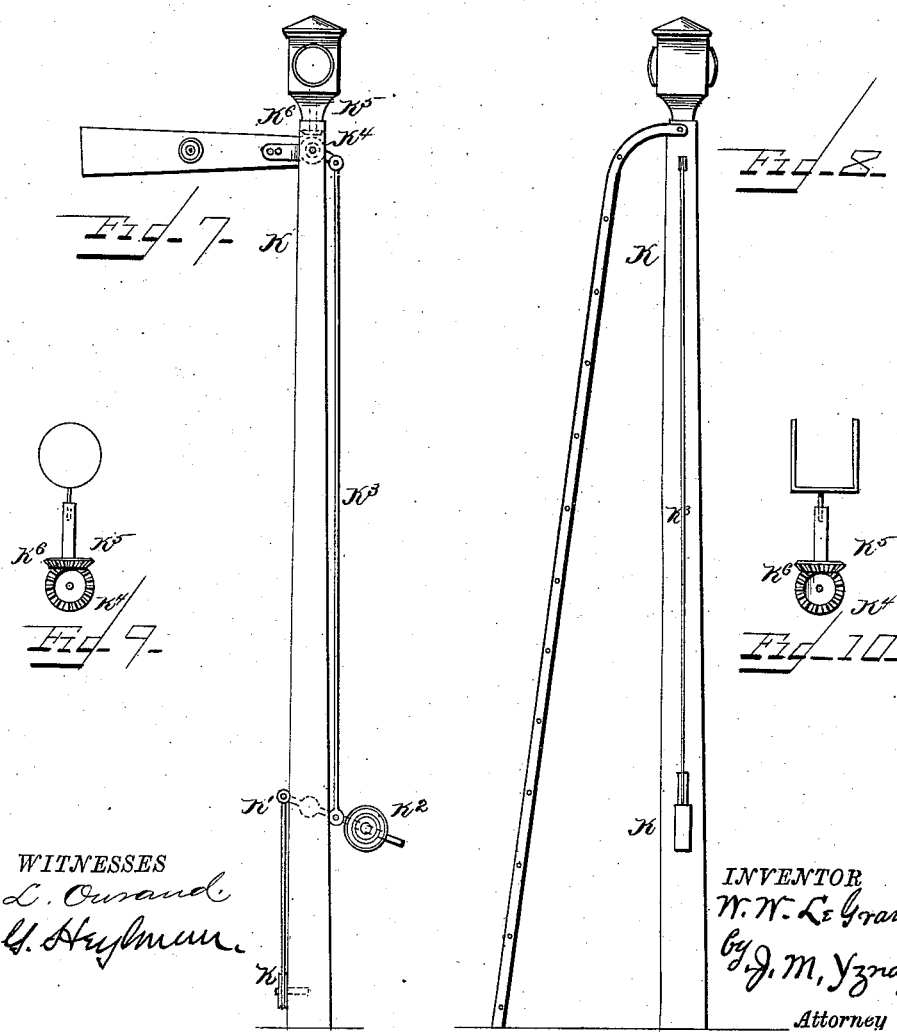
WITNESSES
F. L. Ousand.
A. G. Heyhman.
INVENTOR
W. W. Le Grande
by J. M. Yznaga,
Attorney (No Model.) 5 Sheets—Sheet 5.

W. W. LE GRANDE.
ELECTRO MECHANICAL SIGNAL APPARATUS.

No. 352,903. Patented Nov. 16, 1886.

WITNESSES
F. L. Ourand
A. G. Heylmun

INVENTOR
W. W. Le Grande
by J. M. Yznaga.
Attorney

UNITED STATES PATENT OFFICE.

WILLIAM W. LE GRANDE, OF LOUISVILLE, KENTUCKY, ASSIGNOR OF ONE-HALF TO H. R. DERING, W. W. DERING, AND T. H. UPPERMAN, ALL OF SAME PLACE, AND GEORGE E. ROCKWELL, OF INDIANAPOLIS, IND.

ELECTRO-MECHANICAL SIGNAL APPARATUS.

SPECIFICATION forming part of Letters Patent No. 352,903, dated November 16, 1886.

Application filed October 14, 1885. Serial No. 179,845. (No model.)

*To all whom it may concern:*

Be it known that I, WILLIAM W. LE GRANDE, a citizen of the United States of America, residing at Louisville, in the county of Jefferson, in the State of Kentucky, have invented a new and useful Electro-Mechanical Signal Apparatus, of which the following is a specification.

My invention has relation to improvements in apparatus for operating railway and similar signals, and the object is to provide an electro-mechanical interlocking and signal apparatus whereby the semaphores or signals on any given number of ways crossing each other shall be operated successfully, reliably, and certainly by a single hand-lever.

My invention therefore consists in electro-mechanical means for holding the apparatus locked against the manipulation of the operator to the extent that no "clear" signal can be given to any one of the guarded sections of track unless a train is entering thereupon.

My invention further consists in mechanism and electro appliances whereby if two or more trains come on the different sections of track, or trains standing for "clear" signal, that train having the right of way shall receive the first "clear" signal, and then the next in order.

My invention further consists, in an electro-mechanical signal apparatus, of a series of electro-magnets having armatures of peculiar construction, adapted to serve as fulcrums or rests for the pull-bars.

My invention further consists, in an electro-mechanical signal apparatus, of circuit-closers of a particular construction, whereby the circuits, with the interlocking device, shall be established independently of the direct circuit to the local battery.

My invention further consists in the novel construction, arrangement, and combination of parts, as will be hereinafter fully described, and as the same shall be specifically pointed out in the claims made hereto.

I attain the objects and purposes of my invention by means of the mechanism and appliances illustrated in the accompanying drawings, wherein—

Figure 1 is a plan view of two railways crossing each other, the sections thereof being insulated from each other and from the central section at the crossing, and having conducting-lines laid to the respective sections connecting the apparatus with the batteries. Fig. 2 is a side view, in elevation, of the complete apparatus, a side plate of the casing being removed to show the arrangement of the parts within the housing. Fig. 3 is a similar view, on an enlarged scale, showing the electro-magnets, the interlocking electro-magnet, and the auxiliary circuit-closers with their conductors. Fig. 4 is a side view of one of the electro-magnets, showing the construction of the armature, its position when lodged under the pivoted pull-bar being shown in dotted lines. Fig. 5 is a top plan view of two of the pull-bars, showing the latched ends, a circuit-closer, and an electro-magnet, the parts being arranged in their relative position. Fig. 6 is a side view of the same parts, the position of the pivoted pull-bar when engaged with the corresponding pull-bar being shown in dotted lines. Fig. 7 is a side view of the semaphore-standard and semaphore. Fig. 8 is a rear view of the same. Figs. 9 and 10 are views of the lantern-signals. Fig. 11 is a perspective view of the interlocking magnet and its adjuncts.

In the drawings similar parts are identified by like letters of reference.

The letter A designates the box or casing within which the mechanism and appliances connected immediately therewith are contained and mounted. This casing consists of metal sidings, top, and bottom. Within the metal casings is a lining of hard wood, which is secured therein by any suitable means. At the forward or lever end of the casing is an aperture or slot through which the connecting-bar between the hand-lever and the vertical slide is passed, and in the other end is formed a chambered slot to receive the plate which carries the pull-bars, and also having recesses through which the latches or pull-bars project and slide. The casing is of such dimensions and capacity as to permit the arrangement and mounting of the apparatus within it without unnecessary contact or restriction. To the under side or ceiling of the casing is secured a metal plate, $a$, formed with a longitudinal groove, $a'$, within which the end of the vertical slide $a^4$ fits and slides, and on the floor of the casing is another metal plate, $a^2$, which is also formed with a groove, $a^3$, to receive the foot of the slide $a^4$. Within the grooves $a'$ and $a^3$ is arranged the plate or sliding bar $a^4$, to which the hand-lever is connected on the one side, and to the other side are connected the pivoted latches or pull-bars, as will be hereinafter more fully specified.

The letter B designates a rectangular metal plate secured in the casing in the slot or chamber of the end piece, and arranged with a portion of the plate projecting outside of the casing, substantially as shown in Fig. 2 of the drawings. To this plate B are secured the vertically-arranged bars $b$ $b'$, having spaces or ways formed therein or pins projecting through them, forming seats or rests for the latches or pull-bars.

The letters $b^2$ designate latches or pull-bars arranged horizontally through the ways or slots in the bars $b$ $b'$, with their outer ends projecting from the casing, and adapted to be connected with the ropes or chains running to the semaphore. The inner ends of these latches or pull-bars are formed with a hook, $b^3$, bent at right angles to the plane of their movements, to engage with the hooked ends of the pivoted latches or pull-bars C, as hereinafter stated, and near the inner end of each latch or pull-bar is a pin or lug, $b^4$, which turns the commutators or circuit-closers when the pull-bars are drawn and returned to a normal position.

On the upper edge of each pull-bar, except the last of the series, is formed a step or cam-block, $b^5$, having inclined faces at their forward end to engage with the pins on the pivoted disks. Pivotally secured to the plate B is a series of disks, (designated by the letters $b^7$,) and to the face of each disk is a lug or pin, $b^8$, from the outer end of which is suspended a bar, $b^9$, the lower end of which is formed with a toe, $b^{10}$, let through holes in a bracket, $b^{11}$, secured to the casing. Each of the vertical bars $b^7$ has pins $b^{12}$ projected through them, which engage with all the latches or pull-bars of the series which are below the specific pull bar or bars directly operated, the purpose of this arrangement being that when a specific pull-bar is drawn and the incline of that bar runs under the pin in the disk all the bars below the moved bar shall be lifted up and no engagement made with any pivoted pull-bar, except the one left in a horizontal position and intended to be operated. The inner ends of these pull-bars are arranged in advance of each other, the upper one being the shortest, and those succeeding being extended in regular succession. The object of this arrangement is to give precedence to the first or topmost latch and magnet, and so on down through the entire series, so that if the circuit from the topmost magnet is connected to or embraces a certain trackage at a crossing or elsewhere, and the semaphore-rope is laid from that bar to the semaphores on this trackage when the armature drops down under the latch and the lever is thrown, that trackage would get the clear signal. The operation in this respect will be fully stated when the workings of the apparatus are defined.

The letters C designate the second series of latches or pull-bars, herein named "the pivoted latches or pull-bars," to distinguish them from the pull-bars connected directly to the ropes or chains leading to the semaphores or signals, and which have been described in the paragraph immediately preceding. These pivoted pull-bars C are pivotally secured at one end to the vertical slide $a^4$, as at $c$, being supported in horizontal position on pins $c'$, fixed in the slide and projecting therefrom and formed with inclines or steps $c^2$ on their under side, and have their free ends hooked, as $c^3$, to hook in the hooked ends of the pull-bars $b^2$. The upward movement of these pivoted bars is limited by pins $c^4$, arranged above them in the slide, substantially as shown.

The letter D designates a sector secured at its base and vertical limb to the projecting foundation and to the end wall of the casing. The sector is notched, as usual, and has pivoted to it the hand-lever $d$, provided with a spring-pawl, $d'$, to engage with the notches of the sector and hold the lever in a set position at the limits of movements of the vertical slide. To the hand-lever is pivoted the connecting-rod $d^2$, the other end thereof being pivoted to the vertical sliding bar $a^4$. This single hand-lever, in connection with the elements or parts controlled and operated by the electrical apparatus, serves to operate any single pull-bar a specified number of the series.

The letter K designates the semaphore or signals. These are placed by the tracks, as usual, and have connection with the respective pull-bars which pass from the end of the semaphore under a sheave, $k$, pivoted near the base of the signal-standard, and has its end secured to an arm of a lever, $k'$, also pivoted on the signal-standard. This lever $k'$ has the opposite arm extended and the weight $k^2$ arranged thereon. Between the weight and the pivot of the lever is attached one end of the rod $k^3$, which has the other end attached to the lever which operates the vane or signal. The lever which is fitted to and operates the vane is of peculiar construction, designed for the double purpose of actuating a vane or signal and for operating a lantern-signal. To this end I form the signal-lever with a bevel gear-wheel, $k^4$, the axis of which is the bolt or pin which holds the lever to the standard. Within the lantern is arranged a vertical shaft, $k^5$, having on its lower end a beveled gear, $k^6$, to mesh with the reel $k^4$, and on its upper end is fitted the shifting transparency, substantially as seen in Figs. 9 and 10 of the drawings.

It will be perceived that by drawing back the pull-bar the vane is actuated and at the same time the shifting transparency is turned, the latter of course being the signal displayed by means of the light during the night-time. When the pull-bar is released, the vane or signal resumes its normal position of "Danger" by gravity, and the action or movement draws the pull-bar back in normal position, this being effected by means of the weight of the vane and that of the weight on the lever at the base of the standard.

The foregoing embodies the description of the mechanical elements of the apparatus in connection therewith, and controlling the action of the mechanism are certain electrical devices which remain to be described and their functions stated. In this connection the letters E designate electro-magnets. A standard, $e$, of non-conducting material, is vertically fixed in the casing, and to this are secured in vertical succession the brackets $e'$, on which are mounted soft-iron bars $e^2$, having a vertical arm, $e^3$, from the upper end of which the magnets E are supported parallel to the long arm of the bar, the connection being made by a metal screw or other proper means; or the core and bar may be made as in one piece. The bar $e^2$ at the other end has pivoted to it an armature, $e^4$, which has its free end struck out at right angles to the armature-bar, forming a seat, $e^5$, the purpose of which is that when the magnet is demagnetized the armature will drop from contact with the core of the electro-magnet and lodges under the pivoted latch or pull-bar forward of the inclined step in that element, so that when the bar is drawn the step rides up the seat and the bar is lifted into engagement with the hook of the pull-bar adjacent thereto and connected to the semaphore. To each armature is secured a metal spring-conductor, $e^6$, the upper end reaching and having contact with the armature above, and the end of the uppermost spring contacting with a binding-post, $e^7$, fixed in the standard $e$. This arrangement of conductive material gives continuous and controllable circuit to and from the local battery.

The letters F designate circuit-closers. These consist of a specific number of disks of conducting and non-conducting material laid in alternation, the number of conducting-disks being according to the number of circuits to be controlled, and according to the number of approaches to be guarded. In the center of each circuit-closer is inserted an insulating-core, $f$, through which the shaft or support $f'$ is projected. Across the circumferential face of each circuit-closer is laid a non-conducting plate, $f^2$, and on the outer face adjacent to the pull-bars are secured two radial flanges, $f^3 f^4$.

The pin $b^4$ on the pull-bar is arranged between these radial flanges, and the disk is partially rotated on its axis by the movements of the pull-bar in either direction. The disks are supported on the shaft set in or against the plate in the casing, and in the edge of the plate opposite to the disks are formed grooves or other seats, in which are fitted hard-wood supports $f^5$, and to these are attached on their upper and lower faces spring-conductors $f^6 f^7 f^8$, the free ends thereof resting on the conducting-disks of the circuit-closers, substantially as shown. In the apparatus the normal condition or position of these circuit-closers is with the spring resting on the insulating plate projected across the face of the disk, in order that the circuit of the local battery shall not be diverted or disturbed by reason of their connection with the apparatus.

The letter G designates an electro-magnet suitably mounted on a stand secured within the casing. To the support of this electro-magnet is fixed a support, $g$, having a rod, $g'$, upon which is pivotally arranged two armature-levers, $g^2 g^3$, the former of which is pivoted on the rod $g'$, with its axis falling below the core of the electro-magnet with which it contacts, and the latter lever is pivoted on said rod $g'$, with its axis above the core of the electro-magnet with which it contacts. The lower arms of these armature-levers are extended and reach to the groove in the base-piece $a^2$, and are arranged to swing in and out of engagement with notches $g^4 g^5$ in the flange of the groove of said base-piece, and set, respectively, in front and behind the foot of the slide $a^4$, the lever $g^2$ setting in front of the slide and locking the apparatus in normal position, as shown in Fig. 2, and the lever $g^3$ setting behind the slide when drawn back, as shown in dotted lines in Fig. 2, and locking the apparatus in that position. The levers are pivoted as shown in order that they shall swing in opposite directions, the lever $g^2$ being seated in its notch by contact with the core of the magnet, and the foot of the lever $g^3$ being drawn from its notch by contact with the magnet, and gravity operating on each in opposite directions.

In Fig. 1 of the drawings is demonstrated a plan view of two tracks of railway crossing each other at right angles, showing the sections of track insulated from adjacent sections and my interlocking signal apparatus applied to a series of circuit-conductors leading to and from controlling-batteries. The batteries effecting the currents are marked, respectively, H, having conductor 1 leading therefrom to the left-hand terminal of the trackage, then across the track, along the rails, thence across the track to and through the upper electro-magnet of the series E, thence to the track along the rail, thence turned and back to the battery; second, H', having conductor 2 laid to the upper section of the trackage, through the second electro-magnet of the series E, to and along the track and back to the battery; third, the battery $H^2$, having conductor 3 laid to the right-hand section of track, through the third electro-magnet of the series E, to and along the track and back to the battery; and, fourth, the battery $H^3$, having conductor 4 laid to the lower section of trackage, through the lowest electro magnet of the series E, to the track and back to the battery. These several conductors have conducting-connections to the rails of the tracks by short lines $h$, as usual. These several batteries may be conveniently disposed in a covering or house, as best suits the purpose.

The letter I designates a local battery, the conductor 5 from which is carried to connection with the electro-magnet G, from whence it leads to a post, $e^7$, in the standard $e$. Thence the local current passes through the electro-magnets E by means of the spring-conductors $e^6$ and armatures $e^4$, and thence to the local battery. From the conductor 5 of battery I is a shunt-loop, 6, one line of which has connection with the armature-pivot of the armature-lever $g^2$, and the other line has connection with a binding-post, $i$, set behind the armature-lever $g^2$, and provided with a metal contact-point, the purpose being to give action to a bell-signal, $i'$, located in the shunt-circuit when the armature-lever swings out of engagement with the notch and against the contact-point of the binding-post, thus closing the shunt-circuit, ringing the bell. The object is to give an audible signal to the keeper or watchman when a train is approaching.

Attached to each conducting-spring $e^6$, preferably at the point of contact with the pivoted armature, is a conductor, 7, 8, 9, and 10, carried to and connected with the respective spring on the commutator or circuit-closer, and from these main wires are carried conductors, arranged, respectively, in connection with the spring of the other circuit-closers. The purpose of this arrangement is to furnish an auxiliary circuit or auxiliary circuits when the direct line of communication, through the springs and armatures, with the interlocking magnet and local battery, is broken by the dropping of an armature away from its electro-magnet.

In contracts of franchises regulating the right of way for railway-crossings at grade the older line is usually given the right of way, and under all circumstances the rights are predetermined and defined, and the signal stationed and operated accordingly. The normal position of the semaphore or signal being at "Danger," no train is allowed to proceed over the guarded premises until the signal shows that the track is clear. The demonstration in the plan shown in Fig. 1 of the drawings is explained in connection with the foregoing premises, and for this purpose the section H is given the right of way, and the sections related thereto given the subordinate right in succession. A dummy is shown on section H by dotted lines, and the short circuit of the line shown by the arrow crosses the track. This circuit has connection with the upper electro-magnet of the series E when uninterrupted, and which is cut out when the track is invaded by a conducting medium which short-circuits the battery, presenting a direct conductor and cutting out a portion of the circuit. This same functional disturbance and action are accomplished when any section of the track is invaded, and the illustration, in connection with the description, will apply to any and all of the sections of track. Reference being had to the description of parts and adjuncts, together with the drawings, the following statement will fully disclose the operation of the apparatus. So long as the currents from the respective batteries remain in circuit through the respective electro-magnets, the armatures $e^4$ will be attracted and remain in contact with the cores of the electro-magnets, and should the hand-lever be pulled over and down under this condition the latches or hooks of the pull-bars would not engage; but when a train comes on any of the track-sections the battery lined with that section is short-circuited by the current passing from the track-wires through the line-connections therewith, and through the wheels and axles of the car, and the electro-magnet is cut out, thereby demagnetizing the magnet and the armature, and the armature falls outward, assuming a position shown in dotted lines in Fig. 4 of the drawings, with its projecting arm lodged under the pull-bar. With the opening of the circuit, as above described, the circuit of the local battery is also opened or broken by the release of the armature $e^4$, and the electro-magnet G is thus demagnetized and the armature-lever $g^2$ disengaged and swung out of the seat at the base of the slide, thus leaving the slide and the bars free to be pulled by the hand-lever. When this armature-lever $g^2$ is swung clear of the seat, it comes in contact with the contact-point on the binding-post $i$, closes the shunt-circuit, and rings the bell $i'$ in the shunt-circuit. The apparatus is now in arrangement or condition for work, and by pulling down the hand-lever the slide and pivoted pull-bars are drawn forward; that one above the lodged and disengaged armature riding over the end of the armature is lifted up and engages the proper pull-bar connected to the semaphore. The movement brings the incline of the pull-bar in contact with the pin in the disk pivoted to the plate B, and partially revolves the disk, which action raises the pull-bars below, and thus keeps them free from possibility and liability of engagement with the hooks of the other pivoted pull-bars.

It will be noticed that the local circuit has been broken by the dropping away of the armature $e^4$, a condition which must be provided for in order to meet the exigencies of other batteries being short-circuited and the armatures released, and this I accomplish by means of the currents controlled by the auxiliary circuit-closers or commutators F, which are intended to close the circuit of the local battery when two or more trains invade the section of tracks included within the domain of the apparatus, and cut out two or more of the electro-magnets, and consequently cause their armatures to drop away from the cores, leaving the circuit of the local battery open when the first train leaves the track. If but one train enters the section—for instance, the track included within the circuit of the upper magnet—which is given the right of way, then as the top pull-bar is drawn back the pin $b^4$ turns the circuit-closer until the conducting-springs are seated on conducting material and the condition established, which, when the first train leaves the track and the electro-magnet of that circuit is energized and its armature attracted, closes the circuit of the local battery, energizes the magnet of the locking-levers, thereby drawing the armature from its seat, and permits the slide to be pushed back and the apparatus put in condition to give the signals to the train having the right next in order. This peculiar functional activity may be more specifically explained by assuming that the train has entered that section of track related to the upper pull-bar, and that the slide had been drawn back and the operation of signaling completed, the train having left the track; but before doing that another train has invaded the section having relation to the third pull-bar of the series, causing the electro-magnet of that element to be demagnetized and the armature to drop away from the core. This first train has broken the current of the local battery, as stated, and having passed off the section of track the current, with the main battery of that section, is re-established, the electro-magnet is energized, and the armature drawn back from under the pivoted pull-bar and in contact with the core of the magnet; but the battery of the third electro-magnet has been cut out of circuit by the train effecting that circuit, and the armature has dropped under the bar, leaving the local circuit still broken, notwithstanding the restoration of the contact of the armature of the top electro-magnet, and leaving the interlocking lever still in locked position, holding the slide. In this condition, without energizing the electro-magnet G, the locking-lever will not be withdrawn from its seat and the slide cannot be worked; but it will be seen that a circuit is established by the return of the upper armature and spring to contact with the binding-post $e^7$, through the line 10, thence through the circuit-closer, thence to the upper electro-magnet by line 11, through the armature, spring, and post, to the electro-magnet G, and to the battery. The armature-lever $g^3$ being affected and drawn from its seat by the magnetization, then the slide can be pushed back, the latches resume normal position, and the apparatus is in position to give the train awaiting a clear-signal. This explanation applies to all relative positions which may or can occur by the interposition of two or more trains on any section of the track.

I make no claim in this application to the semaphore devices herein described, and as shown in Figs. 7, 8, 9, and 10 of the drawings, as the same will form the subject-matter of another application for Letters Patent.

What I claim as my invention, and desire to secure by Letters Patent, is—

1. In combination with a hand-lever and a vertically-arranged sliding bar adapted to be reciprocated thereby, a latch or pull-bar pivotally attached to said sliding bar and resting normally in a horizontal position, and formed with an incline on its under edge and hooked free end, a pull-bar arranged to slide on bearings and having its outer end connected to the semaphore-strand, and free end formed to engage with the free end of the pivoted pull-bar, a normally-closed track-circuit, and an electro-magnet in said circuit having a pivoted armature adapted and arranged to fall under the pivoted pull-bar when released from contact with the electro-magnet, substantially as described, and for the purpose specified.

2. In combination with a hand-lever and a sliding bar adapted to be reciprocated thereby, a pull-bar pivotally attached to the sliding bar and resting normally in a horizontal position, and formed with an incline on the under edge and hooked free end, a pull-bar having its outer end connected to the semaphore-strand, and its free end formed to engage with the free end of the pivoted pull-bar, a normally-closed track-circuit having an electro-magnet in said circuit, having a pivoted armature adapted and arranged to fall under the pivoted pull-bar when released from contact with the core of the electro-magnet, a normally-closed independent circuit having current through the armature of said electro-magnet, an electro-magnet in said independent circuit, and pivoted armatures on said last-named electro-magnet arranged to lock the sliding bar at the limit of its movements, substantially as described.

3. The combination, with a series of insulated sections of railway-track and a series of independent track-circuits laid thereto, an electro-magnet in each of said circuits, and a railway signaling apparatus, of an independent electric circuit having current through the armatures of all the electro-magnets in series, and closed and opened thereby, and an electro-magnet in said independent circuit having armatures arranged to lock the apparatus in normal position and against return when drawn back, substantially as described.

4. The combination, with a railway signaling apparatus, a circuit, as 5, and battery, as I, said circuit being broken and closed by the breaking and closing of any of the track-circuits, of an electro-magnet, G, disposed in circuit 5, having independent armature-bars $g^2$ $g^3$, pivotally supported on a rod, as $g'$, to contact, respectively, with the cores of said electro-magnet above and below their axes, and throw their lower ends in opposite directions and lock and unlock the apparatus, substantially as described.

5. The combination, with the casing, the sliding bar arranged therein, and a hand-lever adapted to reciprocate the sliding bar, of a series of pull-bars pivotally secured to the sliding bar, and arranged to rest in a horizontal position, and formed with hooked ends, a series of pull-bars arranged to slide independent of each other in a horizontal plane and have their free ends secured to the semaphore-strands, and formed with cam-blocks on their upper edges, except the lowest bar of the series, and having hooked ends to engage with the hooks on the pivoted pull-bars, a series of disks having bars pivotally suspended therefrom and arranged to operate as described, a series of normally-closed railway-circuits, an electro-magnet in each of said circuits having armatures adapted and arranged to fall under the pivoted pull-bars when released from contact with the cores of the magnets, an independent electric circuit having normally a current through the armatures of all the electro-magnets in series, and an electro-magnet in said independent circuit having armatures arranged to lock and unlock the sliding bar, substantially as specified.

6. The combination, with the track-circuit, the electro-mechanical signal-actuating mechanism, and the independent local circuit having the interlocking mechanism mounted therein, of the shunt-circuit having currents through an armature-lever of the interlocking device and an audible signal interposed in the circuit, substantially as described.

7. In combination with the pull-bars of an electro-mechanical signal mechanism, an electro-magnet having an armature pivotally attached thereto, and formed at its free end with a projection struck at right angles to the armature, and disposed and arranged to drop down and lodge under the pull-bar when the electro-magnet is demagnetized, substantially as described, and for the purpose stated.

8. The combination, with the hand-lever and the vertical sliding bar arranged to be reciprocated by said lever, of a series of hooked pull-bars pivotally secured to the sliding bar and supported thereon in a horizontal position, a series of track-circuits having an electro-magnet in each circuit, provided with pivoted armatures having projecting pieces arranged to fall under said pull-bars when the circuit is broken, a series of sliding pull-bars arranged to slide independently of each other in a horizontal plane, means, substantially as described, whereby the pull-bars below the one drawn are lifted up, an independent local circuit having mounted therein an electro-magnet the armatures of which are projected in the path of the sliding bar, and a series of circuit-closers in said independent local circuit, having conducting-connection to all the electro-magnets in series, a single circuit-closer being operated by each of the sliding pull-bars, whereby the interlocking magnet is energized and the armature-lever unlocked when two or more track-circuits are broken, substantially as specified.

9. The combination, with an electro-mechanical signal mechanism, having a series of track-circuits and an interlocking circuit opened and closed by the opening and closing of the track-circuits, of a series of circuit-closers opened and closed by the movements of the pull-bars, and having circuit-conductors to the armatures of each of the electro-magnets in the track-circuits, whereby when two or more of the track-circuits are broken the circuit with the interlocking magnet shall be established, substantially as described.

10. The combination, in an electro-mechanical signal apparatus, of two or more semaphores, two or more pull-bars having connection to a single sliding bar, two or more electro-magnets having armatures arranged to fall under the pull-bars, and a single hand-lever connected to the sliding bar, substantially as described.

11. The combination, with an electro-mechanical signal mechanism, of a circuit-closer composed of a series of disks of non-conducting and conducting material placed in alternation, an insulating-core centrally disposed therein, and an insulating-plate projected across the circumferential face thereof, a series of metal conductors mounted in independent relation on the conducting-disks, and flanges radially arranged on the side of said disk, substantially as described, and for the purpose stated.

In witness whereof I have hereunto set my hand in the presence of two attesting witnesses.

WILLIAM W. LE GRANDE.

Attest:
 A. G. HEYLMUN,
 E. T. PRITCHARD.